ously prepared. The stability constant of the sequestered product is too high, the sequestrant has to be destroyed before the solution is used, in order to recover simpler chromium cations, and this involves additional processing of the stabilized alkaline solutions.

United States Patent Office 2,856,366
Patented Oct. 14, 1958

2,856,366

STABLE ALKALINE METAL SOLUTIONS CONTAINING CARBOXYMETHYL DEXTRAN

Leo J. Novak, Dayton, and Jack J. Bulloff, Columbus, Ohio, assignors to The Commonwealth Engineering Company of Ohio, Dayton, Ohio, a corporation of Ohio No Drawing. Application July 30, 1956
Serial No. 600,732

9 Claims. (Cl. 252—363.5)

This invention relates to stable alkaline solutions of certain water-soluble metal salts and to methods of preparing them.

This application is a continuation-in-part of application Serial No. 397,014, filed December 8, 1953, now abandoned.

More particularly, the invention is concerned with the stabilization of alkaline solutions of water-soluble salts of metals that normally yield, under alkaline conditions, metallic ions which readily form hydrous oxides that precipitate in the alkaline solution.

Water-soluble salts of tervalent chromium are typical of the metal salts to which this invention is applicable. When a water-soluble salt of tervalent chromium, such as the sulfate, is dissolved in aqueous alkaline solution, such as a solution of sodium hydroxide having a pH above about 7.5, the solution is unstable since a hydrous oxide of the metal is formed and precipitates. The hydrous oxide is an amorphous material which is neither definitely a hydroxide nor a crystalline hydrate.

In acidic solution, tervalent chromium ($Cr^{3+}$) yields cations, usually symbolized as $Cr^{+++}$ although they may be mixtures of complex green and violet forms, which have a median basicity compared to metals in general.

In alkaline solution, $Cr^{+++}$ yields, either immediately, on standing at ordinary temperature, or on boiling of the solution, hydrous oxides which are similar to those of $Fe^{+++}$ or $Mn^{+++}$.

In alkaline solution, i. e., at pH above about 7.5, freshly peptized hydrous chromium oxide may be peptized as a sol, or even dissolved as anion to some slight extent in the same way as is hydrous aluminum hydroxide or zinc hydroxide. However, the alkaline solutions of the water-soluble salts of tervalent chromium are not stable but yield the hydrous oxide precipitate on standing at ordinary temperature or, more quickly, on heating. Like the hydrous oxide of other metals, chromium hydrous oxide "ages" on standing with progressive loss of reactivity with time. This greatly complicates the handling of chromium in alkaline solution.

The problem in handling these alkaline solutions of tervalent chromium salts and salts of metals which behave similarly to tervalent chromium salts in alkaline solution, is to prevent precipitation of the hydrous oxides. Such precipitation must be prevented both on standing of the alkaline solutions during storage and when the solutions are heated prior to use, for example in treating textiles and leather.

In the past, numerous and diverse agents have been proposed for use in minimizing the tendency of chromium and other hydrous oxides to precipitate from the alkaline solution. Thus, various stoichiometric agents have been proposed for this purpose. These include complexing anions, chelating agents, and other agents which act by chemical combination with $Cr^{+++}$ or $Cr^{3+}$. Such agents must be present in the alkaline solution in amounts at least chemically equivalent to the amount of chromium therein in order to effectively "sequester" the chromium from precipitation.

If the stability constants of the sequestered products are low, the agent must be employed in amounts in excess of the theoretical equivalent amount. If the stability constant of the sequestered product is too high, the sequestrant has to be destroyed before the solution is used, in order to recover simpler chromium cations, and this involves additional processing of the stabilized alkaline solutions.

In either case, unless the stabilizing agent is a specific sequestrant for the particular metal to be protected from precipitation, further excesses of it must be used in practice, especially if elements which are "carriers" would otherwise precipitate from the solution. Specific stoichiometric agents include acids or acid salts such as salts of tartaric, gluconic, citric and ethylenediamine-tetra-acetic acid, the latter being available commercially under the trade-names "Versenes" and "Sequestrenes."

Another type of agent which has been proposed heretofore for use in stabilizing the alkaline solutions is known as a "non-stoichiometric" agent. This exerts a stabilizing influence against precipitation either by thickening the solution or by stabilizing colloidal hydrous oxide particles as "sols," in effect stopping the phenomenon known as "ageing." Specific agents of this type include glues, vegetable gums, and other "inert" polymers.

A disadvantage of the latter type of agents is that many of these materials are heat-sensitive, form surface films and scum on evaporation, synerize on standing and yield solutions of undesirable viscosities and capricious sensitivity to other auxiliary agents or substances which must be used in combination or admixture with the stabilized solutions for various purposes.

The object of this invention is to provide stable aqueous alkaline solutions of salts of chromium and the like and new stabilizing agents for the solutions which, while having the desirable properties of the stoichiometric and non-stoichiometric stabilizers, do not have the disadvantages of the latter and possess advantages over them. Other objects and advantages of the invention will appear hereinafter.

In accordance with the invention, aqueous alkaline solutions of the salts of the metals of the type described are stabilized by the addition thereto of a carboxymethyl dextran or alkali metal salt of carboxymethyl dextran.

The dextrans are high molecular weight bacterial polysaccharides made up of anhydroglucose units and characterized by the fact that these units are joined by molecular structural repeating linkages of both alpha-1,6 and non-alpha-1,6 types, at least 50% of the linkages being, apparently, of the alpha-1,6 type.

The dextrans may be obtained in various ways. For example, the native dextrans may be obtained by enzyme synthesis from sucrose in the presence or substantial absence of bacteria and cellular debris. Thus, a sucrose-bearing medium may be inoculated with a culture of a suitable microorganism, such as those of the *Leuconostoc mesenteroides* and *L. dextranicum* types, and incubated until the maximum amount of dextran is formed. This is so-called "whole culture" synthesis. Or the culture of the microorganism may be filtered to obtain the substantially pure enzyme and the filtrate containing it, or an aqueous solution of the enzyme precipitated from the filtrate, may be introduced into the sucrose-bearing medium and the mixture held until the dextran is produced.

The dextran obtained by either method is the "native" product having a high molecular weight which may be in the millions. These dextrans can be separated, by fractional precipitation, into fractions of various molecular weight, as desired. The native dextran itself, or any selected fraction of given molecular weight between 2000 and that of the native dextran, may be carboxymethylated to obtain a product of the formula $Na_yCMD^{n_{c'}}$, where $CMD^{n_{c'}}$ represents a carboxymethyl dextran ion, $CMD^{y-}$, of average molecular weight $n_{c'}$, and $y$ equals $nx$, where $n$ is $n_{c'}/M_{AGU}$, $M_{AGU}$ being the molecular weight of one anhydroglucose unit (AGU) of the dextran polymer substituted with $xCH_2CO_2-$ groups, and having an average degree of substitution, D. S., of "$x$," $x$ varying from about 1.0 up to 3.0.

Table I summarizes various examples which are illustrative of the invention. The starting solutions were obtained by dissolving a water-soluble salt of tervalent chromium, specifically the sulfate, in aqueous sodium hydroxide solution of varying hydroxide concentration, and incorporating carboxymethyl dextran in the resulting solution. The normalities of the solutions containing the carboxymethyl dextran were arrived at using the unequivocal equivalent weight per anhydroglucose unit for $CMD^{x-}$ as $(162.14+57.03x)/x$. The carboxymethyl ion is designated as $CMD^-$ in the table. The normalities of the chromium and of the sodium hydroxide are represented in the conventional manner, as $Cr^{3+}$ and $OH^-$. The pH of the solutions can be readily calculated from the normalities listed under $OH^-$ in the table. In these particular examples, the pH of the solution was between about 10.0 and 14.0. It has been determined that carboxymethyl dextran and the alkali metal salts thereof are effective stabilizers for alkaline solutions of the water-soluble metal salts having a pH of 8.0 and higher.

TABLE I

*Stabilized alkaline chromic solutions*

| $CMD^-/Cr^3$ | $Cr^{3+}$ | $OH^-$ | $CMD^-$ | 99° C. | 25° C. | Unit Color |
|---|---|---|---|---|---|---|
| 4.10 | 0.041 | 0.14 | 0.178 | 24 hrs | 18 H | 1. |
| 2.00 | 0.041 | 0.12 | 0.082 | 2.5 H | | 1. |
| 1.42 | 0.038 | 0.18 | 0.054 | 2.2 H | | 1. |
| 1.21 | 0.042 | 0.36 | 0.051 | 9 H | 34 H | 1. |
| 1.00 | 0.038 | 0.18 | 0.038 | 2.2H | | 1. |
| 0.61 | 0.038 | 0.18 | 0.023 | 2.2 H | | 1. |
| 0.30 | 0.076 | 0.37 | 0.023 | 1.3 H | | 2. |
| 0.099 | 0.088 | 0.42 | 0.0087 | 1.3 H | | 2. |
| 0.61 | 0.076 | 0.36 | 0.046 | 1.1 H | | 2. |
| 0.61 | 0.15 | 0.72 | 0.092 | 36 Min | | 4. |
| 0.61 | 0.30 | 1.4 | 0.18 | 18 Min | | 8. |
| 0.61 | 0.61 | 2.9 | 0.37 | 9 Min | | 16. |
| 0.61 | 1.2 | 5.8 | 0.74 | 4 Min | | High. |
| 0.61 | 2.4 | | | Film | | High. |

As will be apparent, the equivalent concentrations of stabilized alkaline chromium solutions are given in the table. Control solutions of the same pH, but not containing $CMD^-$ anion, yielded precipitates in a matter of minutes in the cold, and in a few seconds on heating.

The solutions of Table I were indefinitely stable in the cold when they contained varying amounts of the carboxymethyl dextran anion of average molecular weight about 100,000.

Under the heading 99° C., the number of hours, H, or minutes, Min., the solutions were boiled after a period of standing, are shown. Under the heading 25° C. the number of hours the boiled solutions stood without precipitation occurring, are shown.

It is apparent, also, from the first column of Table I, that the solutions were stabilized by varying amounts of $CMD^-$. The color and color intensities of the stabilized solutions were, as shown, independent of the $SMD/Cr^{3+}$ concentration ratios, and there was no evidence that the condition of coordination of the chromium therein was in any way different from that in the labile control solutions, which were prepared simultaneously, both the stabilized and unstabilized solutions being of the same unit intensity of deep green hue for identical depths, at the same $Cr^{3+}$ concentrations.

The carboxymethyl dextran behaved as a so-called "hybrid" stabilizing agent, i. e., an agent which exerts its stabilizing influence against precipitation either by thickening the solution or by stabilizing colloidal hydrous oxide particles as "sols," and which also contains active functional groups capable of combining with the metal ion being protected against precipitation.

That the carboxymethyl dextrans behaved to some extent like the non-stoichiometric stabilizing agents (e. g. by thickening or sol-forming action) was evidenced by the fact that the alkaline chromium solutions were stabilized effectively at $CMD^-/Cr^{3+}$ equivalents ratios of less than 1.00. However, that the carboxymethyl dextrans behave predominantly as "hybrids" appears from the fact that ratios of about 0.1 equivalent of $CMD^-/Cr^{3+}$ effectively prevented precipitation of the hydrous oxide from the alkaline solution.

In general, a ratio of 0.09 $CMD^-/Cr^{3+}$ or below is not fully effective in preventing precipitation and at those ratios the protection tends to be "spotty," with some precipitation occurring on unstirred evaporation of the solution. Above a $CMD^-$ concentration of a few weight percent, say 5.0%, the viscosity of the solution increases undesirably, and jelly-like plaques form on boiling or evaporation, distribution of the $CMD^-$, rather than of the $Cr^{3+}$, becoming non-homogeneous.

In general, the preferred $CMD^-/Cr^{3+}$ equivalents ratios lie between 0.1 and 5.0.

The values given in the column headed "$Cr^{3+}$" in Table I were obtained by successive boiling down of a single stock solution to remove aliquot portions of the aqueous alkaline medium, thereby successively and progressively increasing the $Cr^{3+}$ concentration. As is apparent from the table, concentrated solutions of $Cr^{3+}$ in strongly alkaline solution may be stabilized according to the present method. Such solutions may be extremely viscous and form jellies or jelly-like masses on cooling or on further evaporation, which jellies can be redissolved in water, even after baking thereof at 100° C., to restore them to stable alkaline tervalent chromium solutions.

The stabilized solutions of Table I were titrated with hydrochloric acid, with the results shown in Table II.

TABLE II

*Acidification of alkaline chromium solutions*

| $CMD^-$ | $Cr$ | $OH^-$ | $CMD^-/Cr$ | Boiled | Ml. Acid Added |
|---|---|---|---|---|---|
| 0.00 | 0.072 | 0.34 | 0.00 | No | 1.15–1.25 (Control). |
| 0.0077 | 0.076 | 0.37 | 0.10 | No | 1.15–1.25. |
| 0.016 | 0.082 | 0.39 | 0.20 | No | 1.15–1.25. |
| 0.013 | 0.032 | 0.15 | 0.41 | No | 1.15–1.25. |
| 0.030 | 0.030 | 0.15 | 1.00 | No | 1.15–1.25. |
| 0.045 | 0.030 | 0.15 | 1.50 | No | 1.15–1.25. |
| 0.061 | 0.030 | 0.15 | 2.03 | No | 1.15–1.25. |
| 0.00 | 0.052 | 0.25 | 0.00 | Yes | 0.0 (Control). |
| 0.011 | 0.043 | 0.20 | 0.25 | Yes | 1.1–1.3. |
| 0.011 | 0.022 | 0.11 | 0.50 | Yes | 1.1–1.3. |
| 0.021 | 0.043 | 0.20 | 0.50 | Yes | 1.1–1.3. |
| 0.026 | 0.052 | 0.25 | 0.50 | Yes | 1.1–1.3. |
| 0.022 | 0.022 | 0.11 | 1.00 | Yes | 1.1–1.3. |
| 0.027 | 0.027 | 0.081 | 1.00 | Yes | 1.1–1.3. |
| 0.027 | 0.027 | 0.013 | 1.00 | Yes | 1.1–1.3. |
| 0.054 | 0.027 | 0.081 | 1.00 | Yes | 1.1–1.3. |
| 0.054 | 0.027 | 0.13 | 1.00 | Yes | 1.1–1.3. |

In all instances, precipitation of the hydrous oxide occurred when the excess sodium hydroxide present was neutralized. For moderate concentrations of $Cr^{3+}$, the excess sodium hydroxide required to re-dissolve freshly precipitated hydrous chromium oxide is about 50% (or 50 mole percent on a mole basis). Conversely, to prevent hydrous chromium oxide from appearing permanently in solutions to which an acid or neutral chromium salt is being added, only about half of the equivalent amount of $Cr^{+++}$ may be added safely. For dilute chromium solutions, where hydrolysis of anions and depeptization of sols is favored, greater ratios of hydroxyl to chromic ions are used. As shown in Table II, under the heading "Ml. acid added," for a unit amount of free sodium hydroxide, precipitation was first observable when a definite amount of acid had been added, and flocculation became apparent on adding a small, but definite, further amount of acid.

The CMD$^-$/OH$^-$, CMD$^-$/Cr$^{3+}$/OH$^-$ ratios did not influence these results.

It will be apparent, from Tables I and II, that CMD$^-$, whether derived from sodium carboxymethyl dextran by dissolution, or from the free ether by dissolution of the salt and subsequent neutralization, is very effective in stabilizing Cr$^{3+}$ in alkaline solutions over an extremely wide range of Cr$^{3+}$ concentrations. The CMD$^-$ ion is non-poisonous, NaCMD solutions do not synerize, and the protected, stabilized solution readily yields hydrous chromic oxide on acidification. Strong acidification results in regeneration of Cr$^{+++}$, but care should be exercised in carrying out the acidification required to accomplish this, since the solubility of chromium carboxymethyl dextranate varies with and is influenced by the pH of the solution. However, as shown in Table II, it is easy to remove Cr$^{3+}$ as the hydroxide once it is desired to do so, unlike the instances in which stoichiometric agents are used, where such removal may be difficult.

Sodium carboxymethyl dextrans of different degrees of substitution were added to solutions of chromium sulfate in aqueous sodium hydroxide and the stabilizing effect was observed. The results are given in Table III which also gives the results obtained when dextran per se was used. The pH of the solutions, calculated from the hydroxyl (OH$^-$) concentration, was about 18.0.

TABLE III

*Stabilized solutions*

| Agent | $n_o$ | $n_o'$ | Percent Soln. | OH$^-$ | Cr$^{3+}$ | 20° C. | 90° C. |
|---|---|---|---|---|---|---|---|
| Na$_{2.7-2.8}$CMD | 70,000 | 140,000 | 0.45 | 0.25 | 0.052 | Clear | Clear. |
| Na$_{2.7-2.8}$CMD | 70,000 | 140,000 | 0.45 | 0.25 | 0.052 | Clear | Clear. |
| Na$_{2.7-2.8}$CMD | 70,000 | 140,000 | 0.40 | 0.24 | 0.075 | Clear | Clear. |
| Na$_{2.7-2.8}$CMD | 70,000 | 140,000 | 0.35 | 0.23 | 0.071 | Clear | Clear. |
| Dextran B-512 | 30,000 | | 0.45 | 0.25 | 0.052 | ppt | ppt. |
| Dextran B-512 | 70,000 | | 0.45 | 0.25 | 0.052 | ppt | ppt. |
| Dextran B-512 | 70,000 | | 0.45 | 0.25 | 0.052 | ppt | ppt. |
| Dextran B-512 | 10$^6$–10$^7$ | | 0.35 | 0.25 | 0.052 | ppt | ppt. |
| Dextran 512 | 10$^7$–10$^8$ | | 1.0 | 0.2 | 0.046 | ppt | ppt. |
| Dextran 523 | 10$^7$–10$^8$ | | 1.0 | 0.2 | 0.046 | ppt | ppt. |
| Dextran 1257 | 10$^7$–10$^8$ | | 1.0 | 0.2 | 0.046 | ppt | ppt. |

The values shown in the table under the heading "20° C." were obtained by allowing the solutions to stand at that temperature. "Clear" indicates that no precipitate appeared on indefinite storage of the solutions, whereas "ppt.," indicates that a precipitate appeared immediately after the solutions were prepared. When the word "clear" appears under the heading "90° C.," it indicates that the solution could be boiled down considerably and then stored for an indefinite period of time without the appearance of a precipitate.

The addition of sodium or other alkali metal salt of carboxymethyl dextran to the normally labile solutions obtained by dissolving the water-soluble salts of tervalent chromium in aqueous alkali metal hydroxide results in stabilization of the solution in the same manner as does the incorporation of free carboxymethyl dextran.

In comparing the results of adding sodium salt of the ether (Na$_{2.7-2.8}$CMD) to the solution with those obtained when the free ether is added, it should be noted that while the carboxylate functionality of the former has been increased by a ratio of 2.7-2.8, the hydroxyl functionality thereof has been decreased by a ratio of 0.15 to 0.10. From this, it appears that however the CMD$^-$ anion acts to stabilize the alkali metal hydroxide solutions of the tervalent chromium metal salts, the stabilizing action is not due primarily to the chemical effects of hydroxyl groups present in the stabilizing agent.

The stable solutions of the invention are obtained by simply mixing the alkali metal salt of carboxymethyl dextran, or the free carboxymethyl dextran, containing an average of about 1.0 to 3.0 carboxymethyl groups per anhydroglucose unit, as such or in aqueous solution, with a solution obtained by dissolving the water-soluble salt of tervalent chromium or similar metal in water containing a sufficient amount of an alkali metal hydroxide to have a pH of at least 7.5 and up to 28.0 or even higher. The CMD$^-$/A$^+$ (A being the metallic cation) equivalents ratio in the solution should be from 0.1 to 5.0.

The carboxymethyl dextran or alkali metal salt thereof may be incorporated in the alkaline solution of the metal salt at any time before the unstable condition of the latter develops. If precipitation of the hydrous oxide of the metal is immediate, the carboxymethyl ether or alkali metal salt thereof should be added as soon as the solution is made up. If the precipitate appears only during storage of the solution, or on boiling thereof, the carboxymethyl dextran or alkali metal salt thereof may be added later, after the solution has been made up but before the precipitate begins to form. Generally, it is convenient to add the CMD or NaCMD as a step in the preparation of the solution of the salt of the metal in aqueous alkali metal hydroxide.

The anion, CMD$^-$, combines with the Cr$^{3+}$ cation, to form a compound or complex which may be isolated from solution and, after drying, occurs in the form of a powder. For instance, the chromium carboxymethyl dextran compound or complex is obtained as a dry powder by adding the carboxymethyl dextran to the alkaline solution of water-soluble chromium salt, precipitating the resulting product or complex by the addition of alcohol, and subjecting the precipitate to vacuum drying.

The dextran carboxymethylated to obtain the sequestrant or stabilizing agent of the invention may have a molecular weight between 2000 and that of native unhydrolyzed dextran, as determined by light scattering measurements. It may be very high molecular weight or native dextran, or it may be a fraction thereof having any desired molecular weight in the range stated. The fractions may be obtained by direct separation from the native product by fractional precipitation or fractional solution, or native dextran may be hydrolyzed under neutral or acid conditions, or enzymatically, and the fractions separated from the hydrolyzate, as by fractional precipitation using successive additions of a precipitant such as a water-miscible aliphatic alcohol or ketone.

The carboxymethyl derivatives may be obtained in any suitable way as for instance by the method described in the application of L. J. Novak et al., Serial No. 346,016, filed March 31, 1953, and now abandoned, according to which, briefly, the selected dextran is treated in aqueous solution or suspension with an excess of strong alkali metal chloracetate such as sodium or potassium chloracetate, in the presence of an excess of a strong alkali metal hydroxide such as sodium or potassium hydroxide at a temperature from 50° C. to 100° C. for a time ranging from about 10 minutes to about two hours. Preferably, the molar ratio of the chloracetate to dextran is between 2:1 and 12:1, the molar ratio of the hydroxide to dextran is between 5:1 and 15:1; and the molar ratio of the water to dextran is between 70:1 and 120:1. This results in the production of the corresponding alkali metal salt of the ether which may be used as such in the present process. Or the free ether may be recovered from the salt by mixing the latter with water, acidifying the mixture to a pH of about 2.0, and precipitating the carboxymethyl dextran by means of acetone or a water-miscible alcohol. By this procedure carboxymethyl dextran having a D. S. of from about 1.0 up to 3.0 carboxymethyl groups per AGU can be obtained.

The alkali metal salt of the carboxymethyl ether corresponding to the alkali metal hydroxide used as catalyst in the reaction is obtained as initial product. Either the alkali metal salt or the free ether may be used in practicing this invention.

The invention has been discussed in detail as practiced in connection with the stabilization of aqueous alkali metal hydroxide solutions of the water-soluble chromium salts. However, the invention is of wider application. We find that aqueous alkali metal hydroxide solutions of the water-soluble salts of other metals which present the same problem of instability as the chromium salts and form hydrous oxide precipitates in the alkaline medium, can be effectively stabilized against precipitation of the hydrous oxides by the inclusion therein of carboxymethyl dextran or an alkali metal salt thereof.

Examples of the metallic elements which may be stabilized in accordance with this invention include beryllium, aluminum and its congeners, scandium and its congeners including the lanthanides and actinides, and the transition and post-transition metals of the long periods. The alkaline solutions of the water-soluble salts of these metals are prepared as described previously, by dissolving the salt in an aqueous solution of alkali metal hydroxide of such concentration that the solution has a pH of 8.0 to 28 or even higher.

The metal-carboxymethyl dextrans formed may be isolated from the aqueous solutions as described above in connection with the chromium-carboxymethyl dextran compounds.

The stabilized solutions of the invention are useful for a variety of purposes, for instance in analytical, separative and tanning processes, and in any method or for any purpose for which stable, alkaline solutions of the metal salts are required or desired.

It has been proposed, in the past, as for example in the U. S. patent to Meurant 694,658, to include small amounts of sugar, molasses and so on to acid or neutral solutions of metal salts used in electroplating. The purpose of adding the colloids to those solutions, and the function thereof, is discussed in "Electroplating," by A. H. Sanders, published in 1950 by International Textbook Co., Scranton, Pa. At page 20, the author, discussing electroplating, states:

"Addition agents.—Further assistance can be obtained by the addition of small quantities of colloid substances like gelatin, glue, albumin, etc., which are so-called 'addition agents.' No one knows exactly how they act to improve the throwing power but the fact remains that they do, and they also improve the character of the deposit."

The gelatin, sugars, molasses etc. assist in electroplating with acid and neutral solutions of various metal salts by facilitating precipitation of the metal on the base being plated. This may be compared with the results shown in Table III when dextran per se was added to the present solutions.

It will be apparent that applicants' invention involves a different concept and discovery since it prevents precipitation, in alkaline solution, of the hydrous oxides of those metals which tend to yield the precipitates under alkaline conditions. Instead of facilitating precipitation of the metal, the carboxymethyl dextran acts to sequester the metal from precipitation.

Various changes and modifications may be made in the details described, in practicing the invention, without departing from the spirit and scope thereof, and it is to be understood, therefore, that it is not intended to limit the invention except as defined in the appended claims.

What is claimed is:

1. A stable aqueous alkaline solution of a water-soluble salt of a metal which, in alkaline solution, yields metallic ions that normally readily form a hydrous oxide which precipitates from the alkaline solution, said solution having a hydroxyl ion concentration between 0.14 N and 5.8 N and containing a substance which prevents precipitation of the hydrous oxide and which is selected from the group consisting of carboxymethyl ethers of dextran having a molecular weight between 2000 and that of native, unhydrolyzed, microbiologically produced dextran, said ethers containing an average of from 1.0 to 3.0 carboxymethyl groups per anhydroglucose unit of the dextran, and alkali metal salts of said ethers, the amount of the dextran derivative present in the solution being such that the carboxymethyl anion-metallic cation equivalents ratio in the solution is from 0.5 to 5.0.

2. A stable aqueous alkaline solution of a water-soluble salt of a metal which, in alkaline solution, yields metallic ions that normally readily form a hydrous oxide which precipitates from the alkaline solution, said solution having a hydroxyl ion concentration between 0.14 N and 5.8 N and containing a substance which prevents precipitation of the hydrous oxide and which is a carboxymethyl ether of dextran having a molecular weight between 2000 and that of native, unhydrolyzed, microbiologically produced dextran, said ethers containing an average of 1.0 to 3.0 carboxymethyl groups per anhydroglucose unit of the dextran, the amount of the carboxymethyl dextran present in the solution being such that the carboxymethyl anion-metallic cation equivalents ratio in the solution is from 0.5 to 5.0.

3. A stable aqueous alkaline solution of a water-soluble salt of a metal which, in alkaline solution, yields metallic ions that normally readily form a hydrous oxide which precipitates from the alkaline solution, said solution having a hydroxyl ion concentration between 0.14 N and 5.8 N and containing a substance which prevents precipitation of the hydrous oxide and which is a sodium salt of a carboxymethyl ether of dextran having a molecular weight between 2000 and that of native, unhydrolyzed, microbiologically produced dextran, said ether containing an average of 1.0 to 3.0 carboxymethyl groups per anhydroglucose unit of the dextran, the amount of the sodium carboxymethyl dextran present in the solution being such that the carboxymethyl anion-metallic cation equivalents ratio in the solution is from 0.5 to 5.0.

4. A stable, aqueous alkaline solution of a water-soluble salt of tervalent chromium which, in alkaline solution, yields metallic ions that normally readily form a hydrous oxide which precipitates from the alkaline solution, said solution having a hydroxyl ion concentration between 0.14 N and 5.8 N and containing a substance which prevents precipitation of the hydrous oxide and which is a carboxymethyl ether of dextran having a molecular weight between 2000 and that of native, unhydrolyzed, microbiologically produced dextran, said ether containing an average of 1.0 to 3.0 carboxymethyl groups per anhydroglucose unit, the amount of the carboxymethyl dextran present in the solution being such that the carboxymethyl anion-metallic cation equivalents ratio in the solution is from 0.5 to 5.0.

5. A stable, aqueous alkaline solution of a sulfate of tervalent chromium which, in alkaline solution, yields metallic ions that normally readily form a hydrous oxide which precipitates from the alkaline solution, said solution having a hydroxyl ion concentration between 0.14 N and 5.8 N and containing a substance which prevents precipitation of the hydrous oxide and which is a carboxymethyl ether of dextran having a molecular weight between 2000 and that of native, unhydrolyzed, microbiologically produced dextran, said ether containing an average of 1.0 to 3.0 carboxymethyl groups per anhydroglucose unit, the amount of the carboxymethyl dextran present in the solution being such that the carboxymethyl anion-metallic cation equivalents ratio in the solution is from 0.5 to 5.0.

6. In the preparation of an aqueous alkaline solution of a water-soluble salt of a metal which, in alkaline solution, yields metallic ions that normally readily form a hydrous oxide which precipitates from the alkaline solution, the improvement which comprises preventing precipitation of the hydrous oxide by incorporating in an aqueous alkaline solution of the metal salt having a hydroxyl ion concentration between 0.14 N and 5.8 N, an amount of a substance selected from the group consisting of carboxymethyl ethers of dextran having a molecular weight between 2000 and that of native, unhydrolyzed, microbiologically produced dextran which ethers contain an average of 1.0 to 3.0 carboxymethyl groups per anhydroglucose unit of the dextran, and alkali metal salts of the ethers such that the carboxymethyl anion-metallic cation equivalents ratio in the solution is from 0.5 to 5.0.

7. In the preparation of an aqueous alkaline solution of a water-soluble salt of a metal which, in alkaline solution, yields metallic ions that normally readily form a hydrous oxide which precipitates from the alkaline solution, the improvement which comprises preventing precipitation of the hydrous oxide by incorporating in an aqueous alkaline solution of the metal salt having a hydroxyl ion concentration between 0.14 N and 5.8 N, an amount of a carboxymethyl ether of dextran having a molecular weight between 2000 and that of native, unhydrolyzed, microbiologically produced dextran, which ether contains an average of 1.0 to 3.0 carboxymethyl groups per anhydroglucose unit of the dextran such that the carboxymethyl anion-metallic cation equivalents ratio in the solution is from 0.5 to 5.0.

8. In the preparation of an aqueous alkaline solution of a water-soluble salt of tervalent chromium which, in alkaline solution, yields metallic ions that normally readily form a hydrous oxide which precipitates from the alkaline solution, the improvement which comprises preventing precipitation of the hydrous oxide by incorporating in an aqueous alkaline solution of the metal salt having a hydroxyl ion concentration between 0.14 N and 5.8 N, an amount of a carboxymethyl ether of dextran having a molecular weight between 2000 and that of native, unhydrolyzed, microbiologically produced dextran, which ether contains an average of 1.0 to 3.0 carboxymethyl groups per anhydroglucose unit of the dextran such that the carboxymethyl anion-metallic cation equivalents ratio in the solution is from 0.5 to 5.0.

9. In the preparation of an aqueous alkaline solution of a sulfate of tervalent chromium which, in alkaline solution, yields metallic ions that normally readily form a hydrous oxide which precipitates from the alkaline solution, the improvement which comprises preventing precipitation of the hydrous oxide by incorporating in an aqueous alkaline solution of the metal salt having a hydroxyl ion concentration between 0.14 N and 5.8 N, an amount of a carboxymethyl ether of dextran having a molecular weight between 2000 and that of native, unhydrolyzed, microbiologically produced dextran, which ether contains an average of 1.0 to 3.0 carboxymethyl groups per anhydroglucose unit of the dextran, such that the carboxymethyl anion-metallic cation equivalents ratio in the solution is from 0.5 to 5.0.

References Cited in the file of this patent
UNITED STATES PATENTS 694,658   Meurant _____ Mar. 4, 1902